April 5, 1949.    M. DI SALINO    2,466,158
VEGETABLE WASHER
Filed Feb. 14, 1946
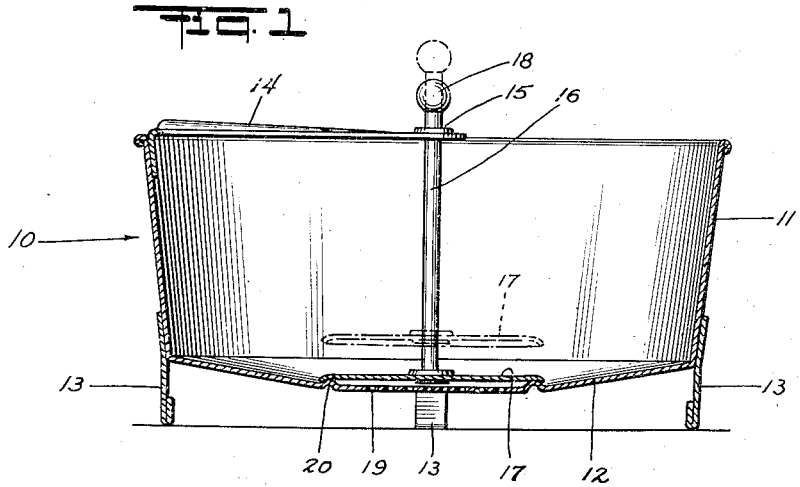
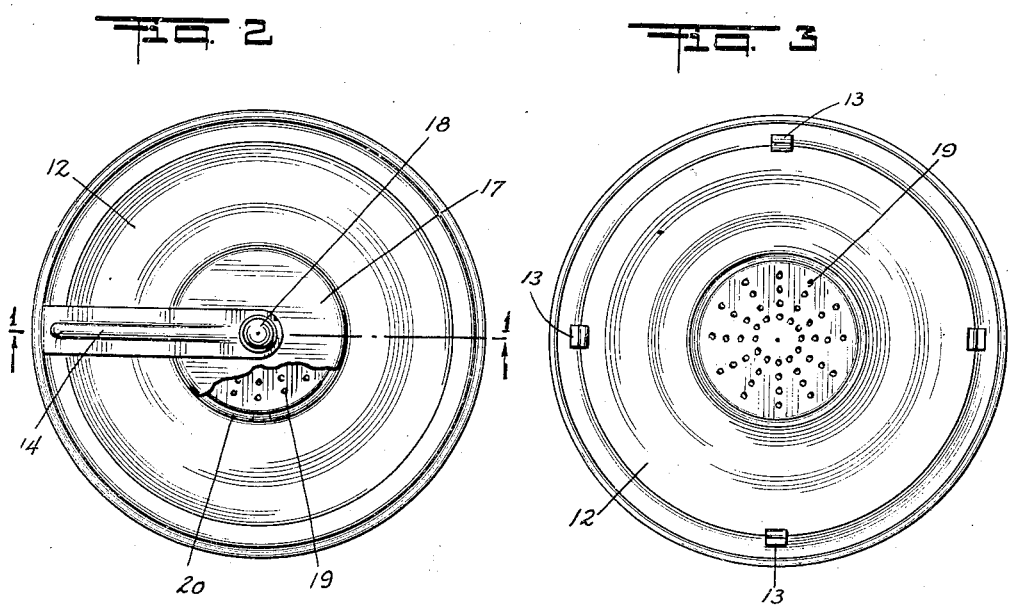
INVENTOR.
Marco Di Salino
BY Irving Seidman
ATTORNEY Patented Apr. 5, 1949

2,466,158

UNITED STATES PATENT OFFICE 2,466,158

VEGETABLE WASHER

Marco Di Salino, New York, N. Y.

Application February 14, 1946, Serial No. 647,467

2 Claims. (Cl. 4—290)

This invention relates to a vegetable washer.

Broadly, it is an object of my invention to provide an inexpensive device in which a large variety of vegetables may be thoroughly and quickly washed.

More particularly, it is an object of my invention to provide a container for washing vegetables in which the foreign matter from vegetables may be quickly removed and caused to wash from the vessel.

A further object of my invention is to provide adjustable means within the vessel so that certain types of vegetables may be thoroughly washed and the water may be made to drain either through the bottom of the vessel, or wash or flow over the top of the vessel depending upon the type and character of the vegetables being washed.

For a complete understanding of the nature and objects of my invention, reference is had to the following detailed description in connection with the accompanying drawings, in which:

Figure 1 is a side sectional view of a vegetable washer taken through line 1—1 of Figure 2.

Figure 2 is a top view showing a portion broken away.

Figure 3 is a bottom view of the device shown in Figures 1 and 2.

Referring to the drawings, numeral 10 is a vegetable washer having sides 11 and a bottom 12. Attached to the sides 11 are legs 13. A bracket 14 is attached to the side 11 and runs from the side slightly beyond the center of the vessel. Bracket 14 has an opening 15 at one end through which a central post 16 passes. The bottom of post 16 has a plate 17 attached thereto. A knob 18 is seated at the top of the post 16 permitting post 16 together with the plate 17 to be raised or lowered. The central portion of the bottom 12 is perforated, as shown at 19 and has a ridge 20 running around the perforated portion. The plate 17 is adapted to be seated upon the ridge so that water will not run through the perforations at the bottom of the vessel.

Vegetable washer 10 may be placed within the sink and the vegetables to be washed placed within the vessel. The plate 17 may be lowered if desired, so that the water will enter the vessel and wash over the top of the sides in cleaning or washing certain types of vegetables. The bottom plate may be slightly raised, depending upon the character of the vegetables to be washed. The foreign matter and the water will in such case drain and wash through the perforations 19 in the bottom of the washer.

It is obvious that certain changes and modifications may be made in the details of construction without departing from the general spirit of my invention.

I claim:

1. A vegetable washer of the character described, comprising sides, a downwardly sloping bottom, a circular rigid ridge running around the central portion of said bottom, perforations in the bottom within said ridge, a central post having a circular flat plate with a downwardly curved rigid edge fixed at the bottom of said post, said plate adapted to be seated upon said ridge with the curved edges of said plate fitting over said ridge, a knob at the top of said post, a bracket attached to said side running past the central portion of said washer, an opening at the end of said bracket to permit said central post to pass therethrough and to retain it in vertical slidable position, and legs attached to said washer for permitting the bottom of said washer to remain above the bottom of said legs.

2. A vegetable washer comprising a bottom and sides, said bottom sloped inwardly and downwardly, perforations in the central portion of said bottom, a circular ridge running around said perforations, legs attached to said washer to raise said bottom above the bottom of said legs, a central post, a circular flat plate having a downwardly curved rigid circular edge overlapping said ridge attached to the bottom of said central post, said plate adapted to be seated upon said bottom ridge closing said perforated bottom portion, a bracket attached to the outer edge of said washer for retaining said post in vertical and movable position whereby when said central post is raised, water and foreign matter will wash through the perforations at the bottom of said vessel and when said central post is in lowered position the water will wash over the sides of said vessel.

MARCO DI SALINO.

REFERENCES CITED

The following references are of record in the file of this patent:

UNITED STATES PATENTS

| Number | Name | Date |
|---|---|---|
| 1,535,604 | Hendricks | Apr. 28, 1925 |
| 1,665,143 | McMillan et al. | Apr. 3, 1928 |
| 2,256,891 | Burman | Sept. 23, 1941 |
| 2,273,693 | Burks | Feb. 17, 1942 |

FOREIGN PATENTS

| Number | Country | Date |
|---|---|---|
| 425,087 | France | June 1, 1911 |